INVENTOR
Richard R. Fitzsimmons
BY
Harry S. Dumars
ATTORNEY

Patented Sept. 15, 1942

2,295,944

UNITED STATES PATENT OFFICE 2,295,944

REFRIGERATION

Richard R. Fitzsimmons, Chicago, Ill., assignor to The Hoover Company, North Canton, Ohio Application August 17, 1939, Serial No. 290,576

16 Claims. (Cl. 62—5)

This invention relates to the art of refrigeration and more particularly to a novel absorption refrigerating apparatus of the three-fluid type provided with means for automatically compensating for conditions produced within the system as the result of variations in atmospheric temperature conditions.

Previous air-cooled three-fluid absorption refrigerating machines are adversely affected by high room temperature conditions due to the fact that such high temperature conditions decrease the ability of the absorber to remove refrigerant vapor from the pressure equalizing medium refrigerant vapor mixture supplied thereto from the evaporator. Consequently, the lean gas supplied to the evaporator contains an abnormally high percentage of refrigerant vapor with the result that less refrigerant can vaporize into a given quantity of inert gas and the capacity of the unit decreases materially at the very time when it is most needed.

Various previous attempts to overcome these difficulties have not been altogether successful. Such previous machines embody various auxiliary pieces of apparatus which are inoperative under normal operating conditions, which are costly and cumbersome to install in the apparatus and to include in the cabinet and which operate principally by altering the effective charge in the system thereby requiring the provision of an excessive charge in the apparatus initially which increases the cost thereof. Accordingly, it is a principal object of the present invention to provide a three-fluid absorption refrigerating system which automatically compensates itself for changes in atmospheric temperature conditions without requiring the provision of expensive, bulky auxiliary apparatus and without requiring alterations in the charge of the system.

It is a further object of the invention to provide an absorption refrigerating apparatus in which the rate of inert gas circulation automatically changes to compensate the apparatus for alterations in atmospheric temperature conditions.

It is another object of the present invention to provide an absorption refrigerating apparatus in which the quantity of inert gas supplied to the evaporator and absorber per unit of time increases with increasing temperature conditions.

It is a further object of the present invention to provide an absorption refrigerating system of the type above described in which the inert gas is circulated by a pressure differential induced therein, which pressure differential is varied in accordance with changing operating conditions.

It is a further object of the present invention to provide an air-cooled absorption refrigerating system in which the refrigerant vapor concentration in selected portions of the inert gas circuit are maintained at certain optimum values under all operating conditions.

It is a further object of the present invention to increase the velocity of circulation of the inert gas in a three-fluid absorption refrigerating system with increasing atmospheric temperatures whereby to improve the scrubbing and heat rejecting action of the absorber and the heat absorbing action in the evaporator.

It is still another object of the present invention to provide a three-fluid absorption refrigerating system which automatically maintains its refrigerating capacity at all conditions of atmospheric temperature.

It is another object of the present invention to provide an absorption refrigerating apparatus of the three-fluid type which is provided with an inert gas circulating fan which automatically adjusts its capacity to meet the changing conditions produced by changes in operating conditions.

Other objects and advantages of the invention will become apparent as the description proceeds when taken in connection with the accompanying drawings in which.

Figure 1:
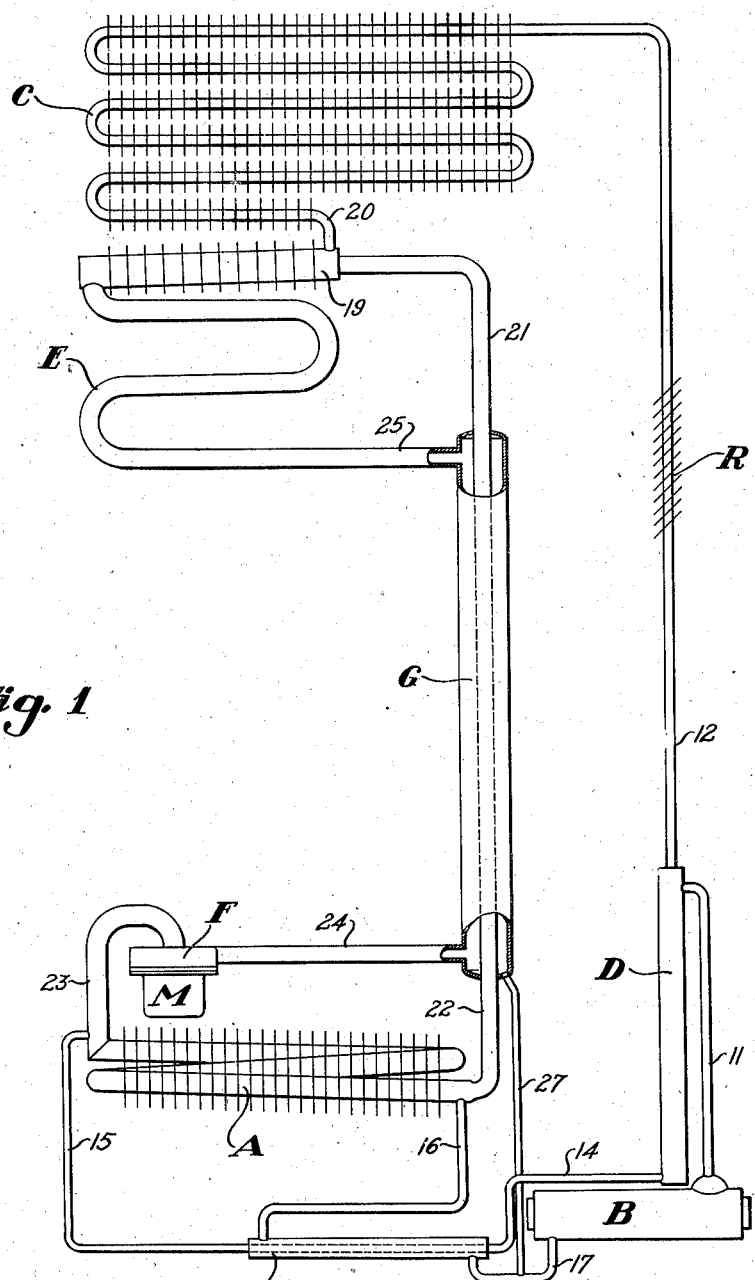
Figure 1 is a diagrammatic representation of a three-fluid absorption refrigerating apparatus embodying the present invention.

Referring now to Figure 1 there is disclosed a three-fluid absorption refrigerating apparatus comprising a boiler B, a gas separation chamber D, an air-cooled rectifier R, a tubular air-cooled condenser C, an evaporator E, a gas heat exchanger G, an inclined tubular air-cooled absorber A, a liquid heat exchanger L, and a circulating fan F which is driven by an electrical motor M. The above described elements are connected by various conduits to form a plurality of gas and liquid circuits to which reference will be made in more detail hereinafter, constituting a complete three-fluid absorption refrigerating system.

The above described system will be charged with a suitable refrigerant such as ammonia, a solvent therefor, such as water, and an inert pressure equalizing medium preferably a dense inert gas like nitrogen.

The boiler B may be heated in any suitable manner as by a combustible fuel burner or an electrical cartridge heater.

The circulating motor M and the heater for the boiler B may be controlled in any suitable or desired manner, a preferred control mechanism being disclosed and claimed in the co-pending application of Curtis C. Coons, Serial No. 148,424, filed June 16, 1937, now Patent No. 2,228,343, dated January 14, 1941.

The application of heat to the boiler B generates refrigerant vapor from the strong solution therein contained. The vapor so produced passes upwardly through the vapor lift pump conduit 11 into the gas separation chamber D conveying therewith a quantity of the solution weakened by the generation of the vapor. The vapor supplied to the chamber D is conveyed from the upper end thereof to the upper end of the condenser C by means of a conduit 12 which includes the air-cooled rectifier R. The rectifier R serves to condense vapor of absorption solution which may be generated in the boiler and passed into the conduit 12 from the separation vessel D.

The weak absorption solution which is supplied to the vessel D is conveyed therefrom to the upper portion of the absorber A by means of the conduit 14, the liquid heat exchanger L and the conduit 15. A liquid level sufficient to cause gravity flow of the weak solution into the absorber is maintained in the vessel D.

The weak solution which is supplied to the absorber A flows downwardly therethrough by gravity in counterflow relationship to a rich mixture of pressure equalizing medium and refrigerant vapor which is supplied to the bottom portion thereof from the evaporator in the manner to be described hereinafter. The lean solution absorbs refrigerant vapor from the mixture as it is passing through the absorber and the resulting heat of absorption is rejected to cooling air flowing over the exterior walls of the absorber conduit and the cooling fins mounted thereon.

The strong solution thus formed in the absorber is conveyed from the bottom portion thereof back to the boiler B by way of the conduit 16, the liquid heat exchanger L and the conduit 17 thus completing the absorption solution circuit.

The refrigerant vapor which is supplied to the condenser C is liquefied therein by exchange with cooling air flowing over the exterior walls of the condenser and the cooling fins mounted thereon. The liquid refrigerant thus formed is drained from the bottom portion of the condenser into the upper finned box-cooling portion 19 of the evaporator E by means of a conduit 20. The liquid refrigerant flows downwardly through the evaporator by gravity in counterflow relationship to the inert gas flowing upwardly therethrough. The liquid refrigerant evaporates into the inert gas to produce useful refrigeration.

The rich pressure equalizing medium refrigerant vapor mixture formed in the evaporator is conveyed from the upper portion thereof to the lower portion of the absorber A by way of the conduit 21, the gas heat exchanger G and the conduit 22. The rich gas then flows upwardly through the absorber in counterflow relationship to the absorbing solution in the manner described above.

The lean gas thus produced in the absorber is removed from the upper portion thereof to the suction side of the circulating fan F by means of the conduit 23.

The lean gas is placed under pressure by the circulating fan F and is conveyed therefrom to the bottom portion of the evaporator E by way of the conduit 24, the gas heat exchanger G and the conduit 25, thus completing the inert gas circuit.

It occasionally occurs in systems of this type that non-volatile products, such as absorption solution, find their way into the evaporator where they may cause trouble if not removed. In a system as illustrated the non-volatile liquid supplied to the evaporator drains from the conduit 25 into the outer path of the gas heat exchanger G to the bottom thereof from which point it is returned to the strong solution return conduit 17 by means of the conduit 27.

It will be understood that the refrigerating system above described is intended to illustrate only the general type of apparatus with which the present invention is concerned, and that various changes may be made in the specific construction and arrangement of the various elements thereof. For example, the evaporator has been shown only diagrammatically though any known type of evaporator may be used with the present invention including the type in which the liquid refrigerant and propelled stream of inert gas is supplied to the bottom portion of the evaporator and in which the inert gas circulates with a high velocity in order to propel the liquid refrigerant upwardly through the evaporator as it is evaporating into the gas to produce useful refrigeration. Such an evaporator is disclosed and claimed in the co-pending application of Curtis C. Coons and William H. Kitto, Serial No. 386,395, filed April 2, 1941, which is a continuation-in-part of application Serial No. 220,189, filed July 20, 1938.

In systems of this type it has long been observed that high room temperatures resulting in high temperature cooling air very adversely affect the operating characteristics and capacity of the system by reason of the fact that the concentration to which the absorption solution can reduce the refrigerant vapor content of the pressure equalizing medium refrigerant vapor mixture in the absorber is a direct function of the operating temperature of the absorber which is in turn a direct function of the temperature of the cooling air. It has been found, for example, that a reduction in temperature of the cooling air increases the absorbing efficiency of the absorber and results in a decrease of the refrigerant vapor content of the mixture which is returned to the evaporator thereby permitting lower temperatures to be maintained in the evaporator and a greater evaporation of liquid refrigerant into a given quantity of inert gas. Conversely an increase in the temperature of the absorber results in an increase of the refrigerant vapor concentration of the lean gas returned to the evaporator with a resulting decrease in the efficiency and effectiveness of evaporation. The temperature at which evaporation occurs is very largely a function of the refrigerant vapor concentration of the lean inert gas and if this concentration can be maintained at a low value the efficiency of the apparatus will be maintained under all conditions.

In accordance with the present invention the rate at which the inert gas is circulated is stepped up with increasing atmospheric temperatures whereby the apparatus is compensated for this effect.

The regulation of the present apparatus is accomplished automatically by the circulating fan.

The circulating fan F is driven by a constant speed type of induction motor M which is provided with induction coils (not shown) mounted outside the casing and thereby shielded from the atmosphere within the refrigerating system.

Figure 2:
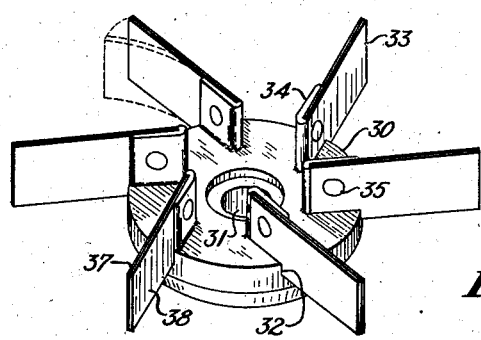
Figure 2 is an enlarged scale perspective view of a circulating fan rotor constructed and arranged to alter its capacity automatically in response to changes in the ambient temperature condition.

As is shown in Figure 2 the rotating element of the circulating fan F comprises a fan blade disc 30 which is provided with a central opening 31 adapted to receive the drive shaft of the rotating portion of the motor. Equally spaced about the periphery of the disc 30 there are a plurality of blades 33, 6 being shown, though any desired number may be utilized in accordance with the needs of the particular system.

The disc 30 is provided with spaced blade receiving slots 32 and upstanding flanges 34. Each of the blades 33 is seated in a slot 32 and is secured to an adjacent flange 34 as by rivets 35. Each blade 33 comprises two flat strips of metal 37 and 38 which are not affected by the corrosive atmosphere prevailing within the refrigerating system and which have different coefficients of expansion whereby to form a thermostatic couple. A suitable combination of metals which meet the specifications are Invar steel and stainless steel. With this construction the blade will shift from the full line position shown in Figure 2 which represents the highest temperature condition obtainable in normal operation of the system to the dotted line position also indicated in Figure 2 which represents the position of the fan blade in the lowest temperature condition likely to be encountered in practical operation.

It is readily apparent from Figure 2 that the effective length and cross sectional area of the fan blade decreases progressively as the temperature decreases, thereby to decrease the effective capacity and discharge pressure of the fan and hence to produce a decrease in the rate in which the inert gas will be circulated thereby.

The fan blades respond directly to the temperature of the lean gas discharged from the absorber, but this temperature is a function of the temperature of the cooling air, hence the capacity of the fan is determined by the temperature of the cooling air flowing over the absorber.

As a result of this construction the fan operates at substantially constant speed but the effective capacity and discharge pressure thereof varies with the temperature of the lean gas taken from the absorber. As the temperature of this gas increases due to increasing atmospheric temperature conditions the velocity with which the inert gas circulates also increases which thereby compensates the evaporator for the slightly higher refrigerant vapor content thereof, as a result of which the capacity of the apparatus is maintained.

Another important feature of the increased inert gas flow results from the fact that the gas has greater turbulence in the evaporator and in the absorber and also scrubs the interior walls of those vessels more violently, thereby improving the heat transfer.

Figure 3:
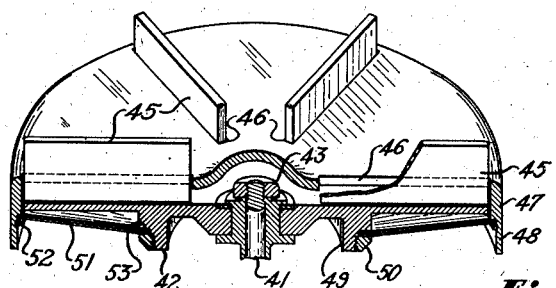
Figure 3 is a partial sectional perspective view of a modified fan construction.
Figure 4:
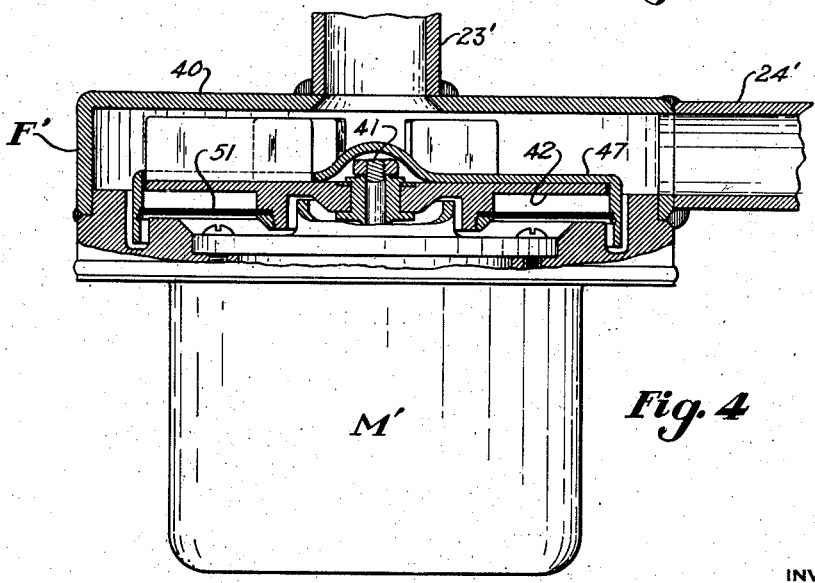
Figure 4 is a partial sectional elevational view of the rotor illustrated in Figure 3 associated with a driving motor and fan chamber.

Referring now to Figures 3 and 4 there is disclosed a modified form of the invention. This form of the invention is identical with that previously described except for the fan construction and therefore only the fan construction is shown in detail, it being understood that the fan is connected in circuit in exactly the same manner as is the fan heretofore described. Certain portions of this apparatus are identical with portions previously described in connection with Figures 1 and 2 and are therefore given the same reference characters primed.

The fan F' comprises a suitable casing 40 which receives the inlet and outlet gas conduits 23' and 24', respectively. The motor M' is suitably secured to the fan casing 40 and is provided with a drive shaft 41. The drive shaft 41 is suitably secured to the fan body disc 42 as by a locking nut 43 or the like. The base disc 42 is provided with a plurality of equally spaced upstanding radially extending fan blades 45 which extend through suitable slots 46 formed in a shroud plate 47. The shroud plate 47 is provided with a peripheral flange 48 extending downwardly as viewed in Figures 3 and 4. The base disc 42 is also provided with an intermediate downwardly extending annular flange 49 which receives an annular nut 50 on its lower end. An annular bimetallic thermostatic plate 51 is rigidly secured to the flange 48 as by a locking ring 52 and is slidably received between the annular nut 50 and a superposed shoulder 53 which is formed on the flange 49.

As a result of this construction flexure of the thermostat 51 raises and lowers the shroud plate 47 with respect to the base plate 42 and thereby increases or decreases the effective height and hence the effective cross sectional area of the fan blades 45. In the operation of the device the end of the thermostat 51 which is positioned between the shoulder 53 and the nut 50 slides slightly therein in order to compensate for the change in the effective distance between the space between the shoulder 53 and the nut 50 and the locking ring 52.

Though a thermostatic disc has been illustrated and described it will be understood that the same may be replaced with a plurality of thermostatic strips or the like without departing from the spirit of the invention.

The bimetallic thermostat 51 is so designed that it will raise the shroud plate 47 substantially to the position shown in Figure 3 when subjected to the lowest temperature likely to be encountered in the practical operation of the system and thereby will reduce the effective size of the fan blade to a minimum.

The thermostatic element 51 will bring the space plate 42 and the bottom side of the shroud plate 47 substantially into engagement, as is illustrated in Figure 4, when subjected to substantially the highest temperature likely to be encountered in the practical operation of the apparatus in which condition the capacity of the fan will be at its maximum value.

Therefore this form of the invention, like that described in connection with Figures 1 and 2, operates progressively to decrease the quantity of inert gas circulating through the inert gas circuit as the ambient temperature progressively decreases from its maximum value.

The herein disclosed invention provides a very convenient means of automatically and positively regulating the capacity of the system in response to changes in atmospheric temperature condition. This highly desirable result is achieved by constructing the circulating fan normally found in systems of the type under consideration in such manner that it automatically alters its capacity and discharge pressure without altering its speed and without requiring the provision of any control mechanism or moving parts in addition to those normally incorporated within the apparatus.

The present type of apparatus is preferably provided with a cycling type control; that is, one which energizes the boiler heater to supply heat thereto at a substantially constant rate and one which simply energizes the substantially constant speed circulating fan. As a result of this construction the rate at which refrigerant is generated and the rate at which the absorption solution circulates is maintained substantially constant but the rate at which the inert gas circulates is varied to maintain the operating characteristics of the apparatus at all atmospheric temperature conditions reasonably to be encountered in actual operation of the apparatus. It will of course be understood that the periods of energization of the boiler-heater will depend upon the demand for refrigeration but that its rate of heating will remain substantially constant.

While the invention has been illustrated and described herein in considerable detail, it is not to be construed as being limited thereto as various alterations may be made in the construction, arrangement and proportion of parts without departing from the spirit of the invention or the scope of the appended claims.

I claim:

1. Absorption refrigerating apparatus comprising a solution circuit including a generator and an absorber, an inert gas circuit including an evaporator and said absorber, means for liquefying refrigerant vapor produced in said generator and for supplying the liquid to said evaporator, means in said inert gas circuit for circulating the inert gas between said evaporator and said absorber, and means for varying the effective capacity of said circulating means to maintain the refrigerating capacity of the apparatus under varying atmospheric conditions.

2. Absorption refrigerating apparatus comprising a solution circuit including a generator and an absorber, an inert gas circuit including an evaporator and said absorber, means for liquefying refrigerant vapor produced in said generator and for supplying the liquid to said evaporator, and a power driven circulator in said inert gas circuit for propelling the inert gas between said evaporator and said absorber, said circulator including temperature responsive means for varying the effective capacity thereof in accordance with ambient temperature conditions.

3. Absorption refrigerating apparatus comprising a solution circuit including a generator and an absorber, an inert gas circuit including an evaporator and said absorber, means for liquefying refrigerant vapor produced in said generator and for supplying the liquid to said evaporator, a centrifugal fan having a plurality of bimetallic thermostatic blades in said inert gas circuit, said fan being arranged to pump the inert gas through said inert gas circuit between said evaporator and said absorber whereby the effective area of said blades varies with the temperature of the inert gas supplied thereto.

4. Absorption refrigerating apparatus comprising a solution circuit including a generator and an absorber, an inert gas circuit including an evaporator and said absorber, means for liquefying refrigerant vapor produced in said generator and for supplying the liquid to said evaporator, a centrifugal fan having a plurality of blades in said inert gas circuit for forcing the inert gas through said evaporator and said absorber, said fan including thermostatic means for altering the capacity of said blades in response to changes in the temperature of the inert gas supplied thereto.

5. Absorption refrigerating apparatus comprising a solution circuit including a generator and an absorber, an inert gas circuit including an evaporator and said absorber, means for liquefying refrigerant vapor produced in said generator and for supplying the liquid to said evaporator, a multi-bladed centrifugal circulating fan in said inert gas circuit for circulating inert gas between said evaporator and said absorber, a shroud plate through which said blades extend, and thermostatic means arranged to alter the relative positions of said shroud plate and of said blades in response to ambient temperature conditions.

6. That method of regulating the operation of refrigeration systems of the type employing a refrigerant, an absorbent, and a pressure equalizing medium inert with respect to the refrigerant and the absorbent, which includes the steps of circulating the pressure equalizing medium between absorbing and evaporating zones by producing a pressure differential in a localized area containing pressure equalizing medium and governing the capacity of the system by altering the said pressure differential in response to atmospheric temperature changes.

7. That improvement in the art of producing refrigeration by means of a refrigerant, an absorbent therefor, and a pressure equalizing medium which is inert with respect to the refrigerant and the absorbent which includes the steps of expelling refrigerant vapor from a solution of the refrigerant in the absorbent by the application of heat thereto, condensing the vapor by heat exchange with cooling air, evaporating the refrigerant liquid into a moving body of the pressure equalizing medium in an evaporating zone, absorbing the vapor from the pressure equalizing medium by contacting the refrigerant vapor pressure equalizing medium mixture in an absorbing zone with solution previously weakened by the expulsion of refrigerant vapor, rejecting the heat of absorption to cooling air, and regulating the capacity of the system by governing the rate at which the pressure equalizing medium circulates between the absorbing and evaporating zones in accordance with the temperature of said cooling air.

8. Absorption refrigerating apparatus comprising a solution circuit including a generator and an absorber, an inert gas circuit including an evaporator and said absorber, means for liquefying refrigerant vapor produced in said generator and for supplying the liquid to said evaporator, a vapor operated pump for circulating absorption solution through said absorption solution circuit, and means in said inert gas circuit for circulating the inert gas through said evaporator and said absorber and for automatically increasing and decreasing the rate of inert gas circulation as the temperature of the inert gas in said absorber increases and decreases, respectively.

9. That method of producing refrigeration which includes the steps of supplying refrigerant liquid to an evaporating zone at a substantially constant rate, circulating an absorbent through an absorbing zone at a substantially constant rate, evaporating the refrigerant into an inert gas circulating between the absorbing and evaporating zones, and varying the quantity of inert gas entering the evaporating and absorbing zones per unit of time in accordance with atmospheric temperature conditions.

10. Absorption refrigerating apparatus comprising a solution circuit including a generator and an absorber, an inert gas circuit including an evaporator and said absorber, means for liquefying refrigerant vapor produced in said generator and for supplying the liquid to said evaporator, means for circulating the absorbing solution through said solution circuit at a substantially constant rate, and means for regulating the rate at which inert gas flows through said evaporator and said absorber per unit of time to maintain the capacity of the system substantially constant.

11. Absorption refrigerating system including an evaporator, a condenser, a boiler and an absorber connected in circuit, a power driven fan for circulating a pressure equalizing medium through a circuit including said evaporator and said absorber, said fan including thermostatic means for altering the effective dimensions thereof in response to a thermal condition of the system.

12. An air-cooled absorption refrigerating system including a boiler, an air-cooled absorber, an air-cooled condenser and an evaporator connected in circuit, means for circulating an absorption solution through said boiler and said absorber at a substantially constant rate, means for circulating an inert gas through said evaporator and said absorber, and means for altering the rate of inert gas circulation in accordance with a thermal condition effecting the operation of the system.

13. That method of regulating the operation of refrigeration systems of the type employing a refrigerant, an absorbent, and a pressure equalizing medium inert with respect to the refrigerant and the absorbent, which includes the steps of circulating the pressure equalizing medium between absorbing and evaporating zones, and maintaining the capacity of the system substantially constant by varying the circulation of the pressure equalizing medium in response to alterations in an operating condition of the system which tends to alter the capacity of the system.

14. A centrifugal fan comprising a driving means, a blade support operatively connected to said driving means, a plurality of fan blades carried by said blade support, a shroud plate embracing said blades and blade support and provided with slots through which said blades project, and a thermostatic element housed within said shroud plate and connected between said blade support and said shroud plate to shift said shroud plate relatively to said blade support and blades in accordance with thermal condition of material being pumped.

15. In an absorption refrigerating apparatus of the type charged with a refrigerant fluid, an absorbing fluid and a third fluid which is inert with respect to the refrigerant and absorbing fluids; an absorber, a generator, an evaporator, means for liquefying vapor of the refrigerant fluid produced in said generator and for supplying the liquefied refrigerant fluid to said evaporator, means connecting said absorber and said evaporator for circulation of the inert fluid therebetween, means connecting said absorber and said generator for circulation of the absorbing fluid therebetween, and a fluid circulating pump in one of said connecting means for circulating fluid therethrough, and means for varying the quantity of fluid circulated by said pump with variations in the thermal condition of the fluid being pumped.

16. That method of regulating the operation of absorption refrigerating systems of the type employing a refrigerant medium, an absorbing medium and a pressure equalizing medium which is inert with respect to the refrigerant and absorbing mediums, which includes the steps of applying heat to a solution of the refrigerant medium in the absorbing medium in a place of generation to evolve refrigerant medium in vapor phase, converting the said refrigerant medium in vapor phase to the liquid phase and conducting the liquid refrigerant medium to a place of evaporation, evaporating the liquid refrigerant into the pressure equalizing medium in a place of evaporation to produce a refrigerating effect, circulating the pressure equalizing medium between the place of evaporation and a place of absorption, circulating absorbing medium between the place of absorption and the place of generation, and maintaining the capacity of the system substantially constant under variations in a condition affecting the capacity of the system by varying the rate of circulation of one of said mediums.

RICHARD R. FITZSIMMONS.